United States Patent [19]

Zimmer

[11] Patent Number: 5,018,686

[45] Date of Patent: May 28, 1991

[54] HYDRODYNAMIC LIFT FOR FLYING BOATS OR SEA PLANES

[75] Inventor: Herbert Zimmer, Friedrichshafen, Fed. Rep. of Germany

[73] Assignee: Dornier Luftfahrt GmbH, Friedrichshafen, Fed. Rep. of Germany

[21] Appl. No.: 398,790

[22] Filed: Aug. 25, 1989

[30] Foreign Application Priority Data

Aug. 26, 1988 [DE] Fed. Rep. of Germany ....... 3828965
Dec. 13, 1988 [DE] Fed. Rep. of Germany ....... 3841878

[51] Int. Cl.$^5$ ............... B64C 35/00; B64C 35/02; B63B 1/30; B63B 1/26
[52] U.S. Cl. .................... 244/106; 244/105; 114/274; 114/282
[58] Field of Search ............ 244/105, 106; 114/282, 114/280, 274, 275, 276, 277, 278, 279, 281

[56] References Cited

U.S. PATENT DOCUMENTS

| | | | |
|---|---|---|---|
| 2,214,945 | 9/1940 | Weihmiller | 244/105 X |
| 2,887,081 | 5/1959 | Bader | 114/282 X |
| 2,906,229 | 9/1959 | Boericke, Jr. | 114/281 |
| 2,926,623 | 3/1960 | Leehey | 114/274 |
| 3,236,202 | 2/1966 | Quady et al. | 114/279 |
| 3,456,611 | 7/1969 | Johnson | 114/282 X |
| 3,498,247 | 3/1970 | Handler | 114/274 |
| 3,742,890 | 7/1973 | Hubbard et al. | 114/279 |
| 3,871,317 | 3/1975 | Szpytman | 114/282 |
| 3,910,215 | 10/1975 | Soderman | 114/282 X |

FOREIGN PATENT DOCUMENTS

| | | | |
|---|---|---|---|
| 517519 | 2/1931 | Fed. Rep. of Germany | 114/279 |
| 882517 | 7/1949 | Fed. Rep. of Germany | 114/275 |
| 1150580 | 6/1963 | Fed. Rep. of Germany | 114/274 |
| 867965 | 12/1941 | France | 114/282 |
| 2512775 | 3/1983 | France | 169/53 |
| 320963 | 9/1934 | Italy | 244/105 |
| 553450 | 5/1943 | United Kingdom | 244/105 |
| 814173 | 6/1959 | United Kingdom | 114/280 |
| 938086 | 9/1963 | United Kingdom | 114/282 |

OTHER PUBLICATIONS

Burnham, Frank, "Aerial Firefighting Comes of Age", 1/1969, American Aviation, pp. 40-42.

Primary Examiner—Margaret A. Focarino
Assistant Examiner—James M. Kannofsky
Attorney, Agent, or Firm—Ralf H. Siegemund

[57] ABSTRACT

A flying boat or sea plane has a wing system in order to obtain hydrodynamic lift when protracted and including two wings arranged one above the other but establishing, in front view, a closed frame; the wing system can be retracted into the fuselage of the vehicle by turning the wings upside down and pulling them into the fuselage using a three-group lever system.

16 Claims, 10 Drawing Sheets

HYDRODYNAMIC LIFT FOR FLYING BOATS OR SEA PLANES

BACKGROUND OF THE INVENTION

The present invention relates to an aircraft vehicle constructed and designed to develop hydrodynamic lift e.g. on take-off and landing and more particularly the invention relates to vehicles such as a flying boat, a sea plane or the like. That is to say, the invention relates to a vehicle which has its basic body provided with supplemental floating or other devices that produce or are capable of producing hydrodynamic lift.

Sea planes of various kind are well known for long period of time whereby certain wings or other parts are provided for hydrodynamic lift as long as the vehicle is on the water. Here then the wing is rigidly connected to the fuselage (or any other craft body) and under the development of a suitable flow pattern the boat will be lifted out of the water when otherwise i.e. without that particular flow pattern any added speed increase the water resistance and drag rather drastically. The wings then lift the boat out of the water and provide merely for hydrodynamic support so that he craft as a whole experiences drastically reduced water resistance.

The so called hydrofoils have a kind of box wing that includes an upper and a lower wing and when seen from the front establish a kind of close frame which is suitable for sea planes, boats or the like, particularly in so called flying boats. In addition it should be mentioned that for the stated purpose V-shaped wings in single or plural arrangement are known. Flying boats and other equipment of the sea plane variety that is particularly provided for take-off and landing on water, there is also the desire for reducing the air resistance and drag resulting from the hydrodynamically effective equipment once the craft is airborne. The water assist equipment now produces air drag. Therefore instead of using rigid wings or winglike arrangements those devices, of a retractable nature for reducing the drag have been proposed. Here then the retracting drive cooperates with straight guide features by means of which these wings are retractable into the fuselage normally or at least approximately normally to the longitudinal axis of the vehicle so as to assume a low drag disposition.

Another sea plane configuration is known through the German patent 705 599 disclosing a hydrodynamically effective wing. By means of a lever arrangement that wing is placed into a protracted or retracted position with a transition from the contour of the fuselage ahead of the structure to the contour of the fuselage in the rear thereof so as to have an overall smooth transition.

DESCRIPTION OF THE INVENTION

It is an object of the present invention to provide a new and improved way concerning equipment and features on vehicles which are hydrodynamically effective having the main goal in mind to reduce the hydrodynamic resistance generally and providing such reduction particularly during landing as well as take-off and to provide in addition air drag reduction to be effective during the flight. Moreover, it is an object of the invention to reduce impacts and shocks on the vehicle when forced to operate in rough seas particularly during take-off and landing.

In accordance with the preferred embodiment of the present invention, the objects are attained by providing one or several supplemental wings which establish additional hydrodynamic lift on the vehicle and with reference to a front view of the vehicle these supplemental wings are constructed to provide an enclosed frame from staggeredly arranged wings; these wings are retractable into the fuselage to assume a low drag disposition. It can thus be seen that in accordance with the invention as applied to flying boats the particular wing establishing the hydrodynamic lift is configured as a box-type wing system and owning to the particular kind and manner of adjustment on one hand any parasitic drag during regular flight and cruising is completely or almost completely avoided while on the other hand a considerable improvement obtains as far as the hydrodynamic lift is concerned resulting in turn in shortening of the take-off length. Also, the impact load that may be produced in heavy seas is avoided. The particular wing configuration permits further a significant reduction of the total weight of the hydrodynamic wing system. The reduction in weight of course is immediately effective as a significant saving in fuel and that in turn increases the payload capability of the craft.

The wing can be advantageously adjacent so that in certain protracted positions it serves as drift anchor and by back and forth adjustment in a limited fashion there may be even be a certain propulsion provided during movement in water, without requiring at that point, other propulsion or at least relieving to a considerable extent the aircraft propulsion system. The retraction of the wing moveover permits traveling of the wing boats in shallow waters and for relatively low speeds. The configuration of the wing that provides the hydrodynamic lift and the mode and manner of adjustment particularly with pivoting about an angle of about 180 degrees between terminal position as far as protraction and retraction is concerned permits a complete retraction of wing parts into the fuselage and permits also covering of the flow separation step or edge, serving as an assist in the positive release from the water and being provided for resistance reduction for that purpose. On the other hand, the known effect of a stop with flow separation edge is provided here through an additional pivotably arranged cover. Owing to bars or spars arranged on wing parts or in between the parts of the hydrodynamically effective wing a certain closure effect is obtained in the direction of the wing span as well as in the direction of flight so that air intake is avoided.

The particular design of the wing adjustment structure permits the insertion of forces as they appear whenever the hydrodynamically effective wing is protracted transversely or at least transverse as far as the flying boat fuselage is concerned. Moreover the adjusting structure can actually occupy only the smallest possible space as far as dimensions in the vertical are concerned.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3 and FIG. 4 are side elevation respectively of portions of the water undercarriage in retracted and protracted position, respectively in;

Figure 1:
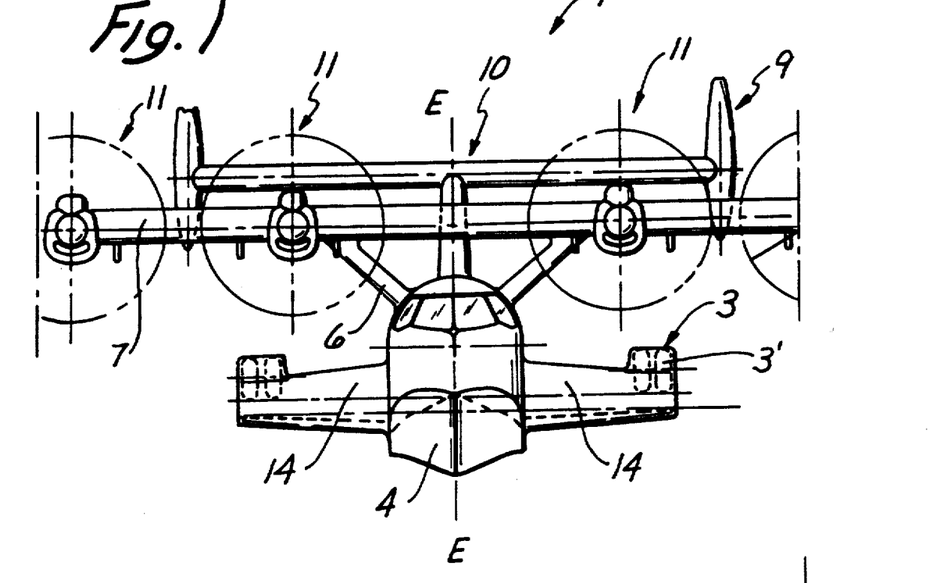
FIG. 1 is a front view of a flying boat with retracted wheels and retracted water undercarriage.
Figure 2:
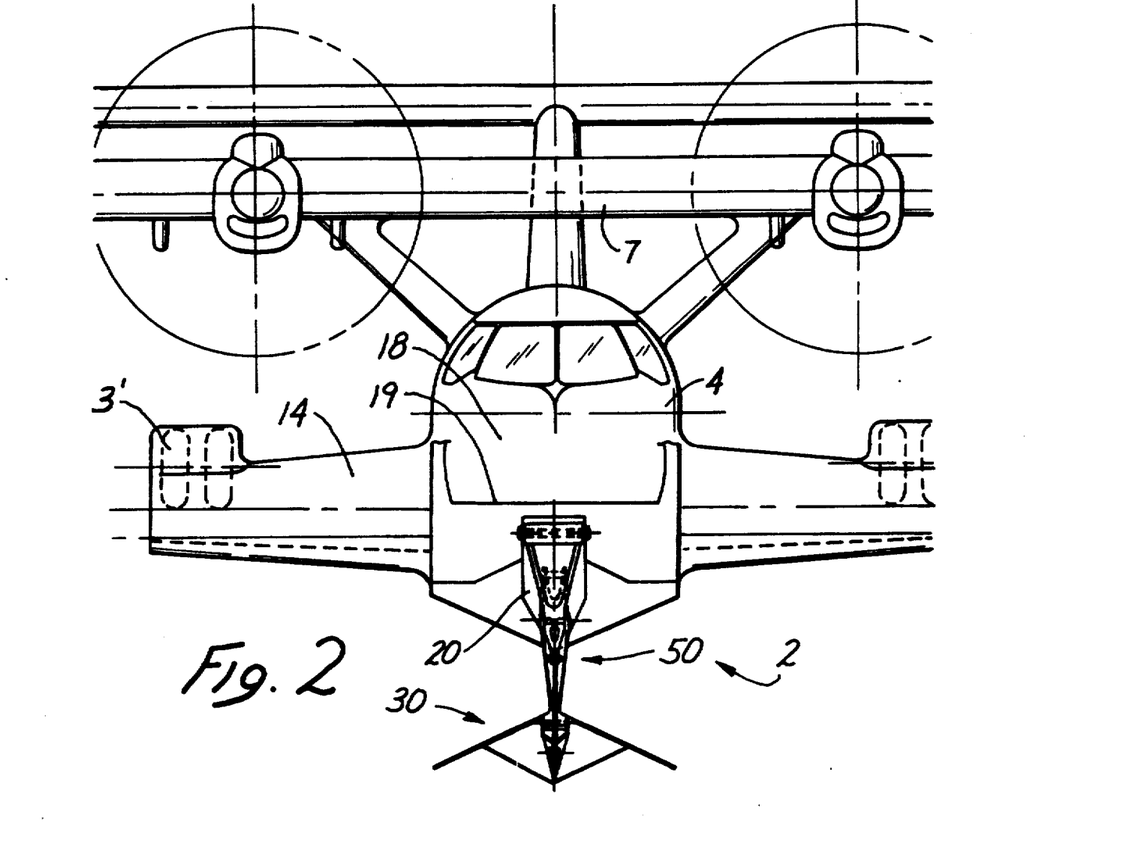
FIG. 2 is a view similar to FIG. 1 but the water undercarriage is protracted.
Figure 3:
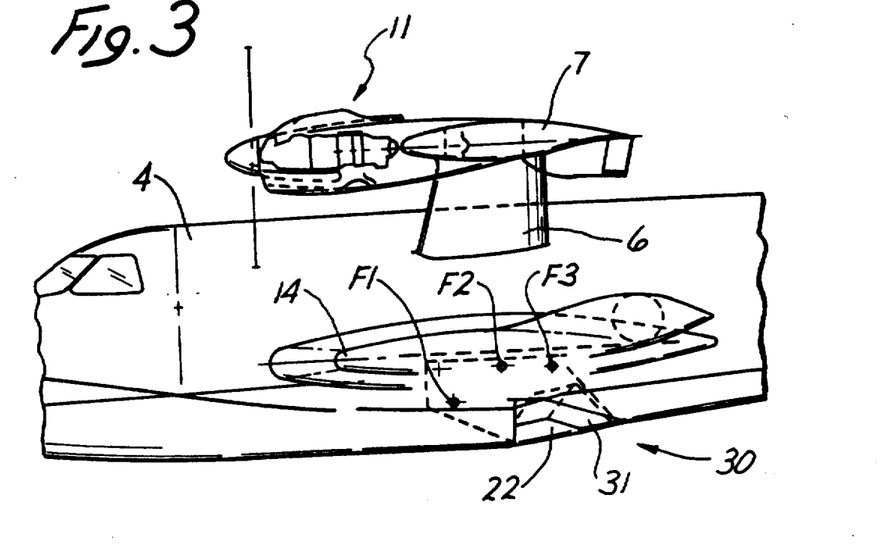
Figure 4:
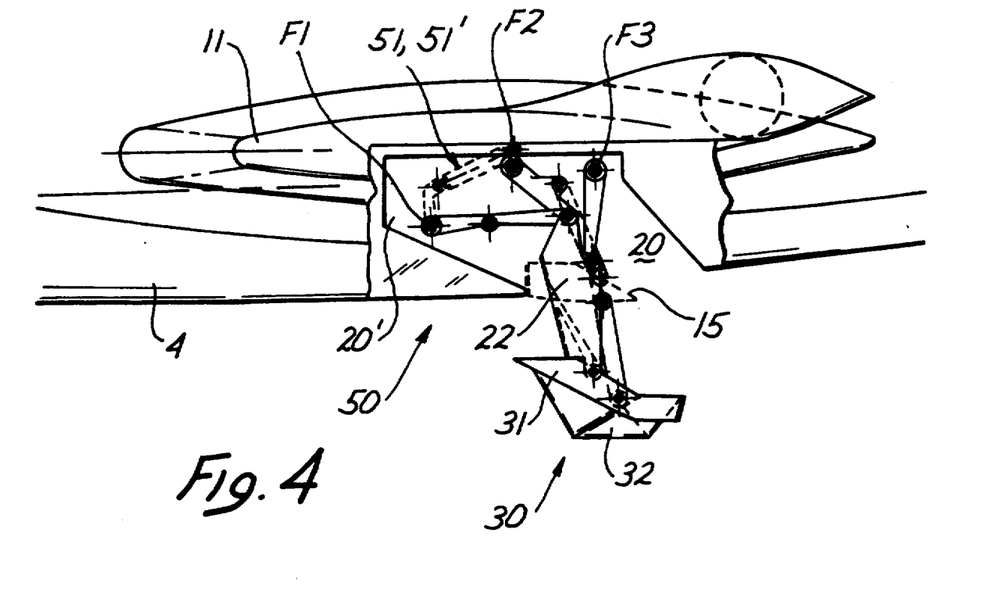

Proceeding now to the detailed description of the drawings, in FIG. 1,3,4 the flying boat 1 as illustrated is an amphibious vehicle provided with a water undercarriage 2 and a wheel undercarriage 3. The wheel is retractable into the fuselage of the flying boat 4 as well as in short wings 14. For this purpose the fuselage is provided in the area of the vertical center plane E-E of the craft with an open space 20 which is open in down direction towards the water surface. The retracting and protracting motion of the water undercarriage is caused by means of lever and drive system 50 which is also provided for retraction in conjunction with hydrodynamically effective wings 30 of the water undercarriage into the space 20. Namely, 18 denotes the interior of the fuselage and 11 is the bottom surface.

Further major units of the fly boat 1 are e.g. the wing arrangement constructed as high wings 7 and connected to the fuselage 4 by means of struts and spars 6. Further shown are rudders 9 and elevators 10 being constructed in a conventional fashion and there are propeller drives 11 arranged on the regular wings 7. The fuselage 4 is provided on two sides with short additional wings 14; they are provided in a known fashion for improving the floatability of the craft and to provide for stability in relation to the longitudinal axis X. Also wings 11 establish supplemental aerodynamic lift. As stated, the example provides for a space or concrement 20 to receive the wheel undercarriage 3 and 3' whereby for reasons of simplification the wheel undercarriages 3 and 3' themselves are not described in great detail because these aspects are also conventional.

Figure 10:
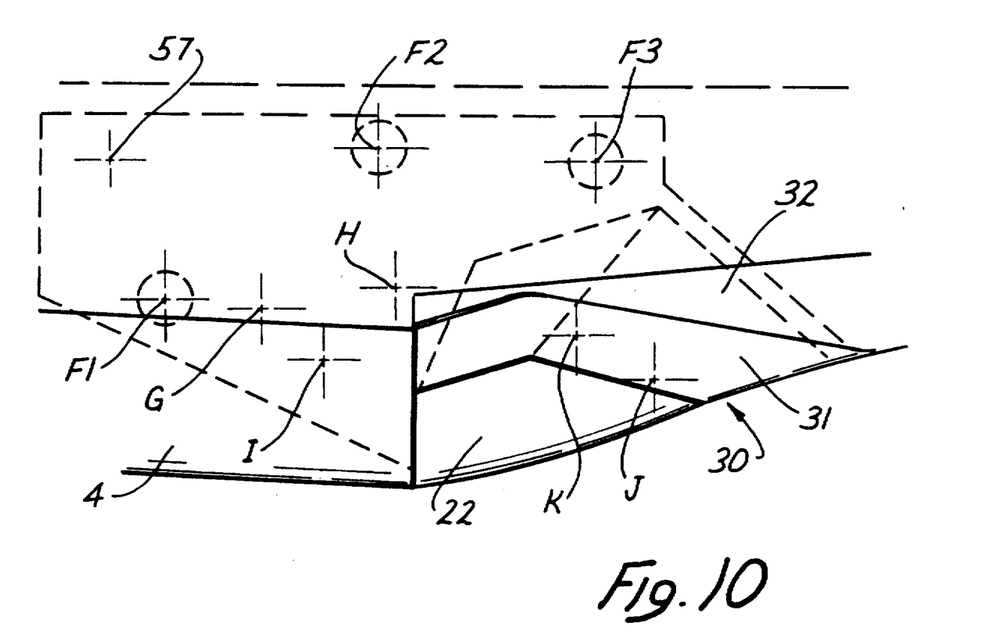

The fuselage 4 moreover is provided with a flow separation edge 15 running transversely to the longitudinal axis x of the craft. This particular edge 15 is provided in lieu of the otherwise conventional step in a flying boat fuselage and provides also a dead water space 16, as shown particularly in FIG. 10 for improving sliding and/or take-off capabilities from the water particularly in the very first and initial stages of take-off. The space 20' in the fuselage 4 of the flying boat is particularly arranged underneath the center of gravity S and covers actually the zone or area in which the flow separation edge 15 is provided. The space 20 above the flow separation edge serves for receiving particularly the lever linkage and adjustment arrangement 15 of the undercarriage 2 particularly when retracted. As will be later explained more fully space 20 can be covered in parts with flaps or covers 22 whenever the linkage is retracted whereby a smooth contour continuation is provided together with the water wings 30 and in conjunction with or relative to the skin surface of the fuselage.

Figure 5:
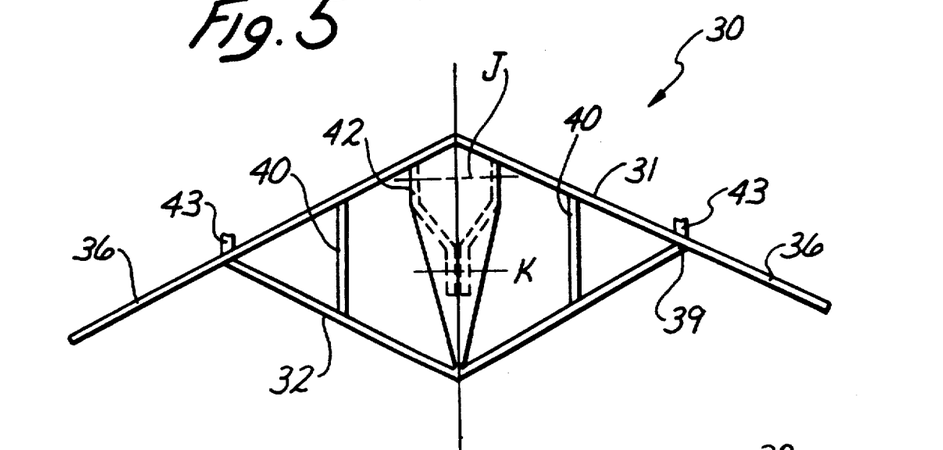
FIG. 5 is a rear view of the water undercarriage.

The water undercarriage 2 is constituted by hydrodynamically effective wings 30 which is configured as box wing or rhombic wing or otherwise as is known from general craft and air/hydrofoil design. The wing assembly 30 in the particular example as shown in detail in FIG. 5,6 is comprised of two vertically staggered wings and specifically 31 and a lower wing 32. Together they form a backward oriented arrow. In the protracted position the upper wing part 31 has negative V-position (in vertical plane view) and the lower wing 32 is provided in positive or upward V position. The wings 31 and 32 together are provided with a common junction 39 on the outer end of the lower wing 32, but separating outer portions 36 of upper wing 31. Connecting bars or spars 41 run along the connecting edge 39 by means of which the two wings 31 and 32 are interconnected. As shown particularly in FIG. 5 and 6 the upper wing 31 is on both sides extended beyond the wing connecting line 39 as far as the lower wing 32 is concerned, by means of these portions 36. Moreover, the upper wing 31 is extended in the direction of the rear edge 38 such that the upper and lower wings 31 and 32 respectively are provided with that connecting edge 39 mentioned earlier which runs in the direction of wing depth t.

Figure 6:
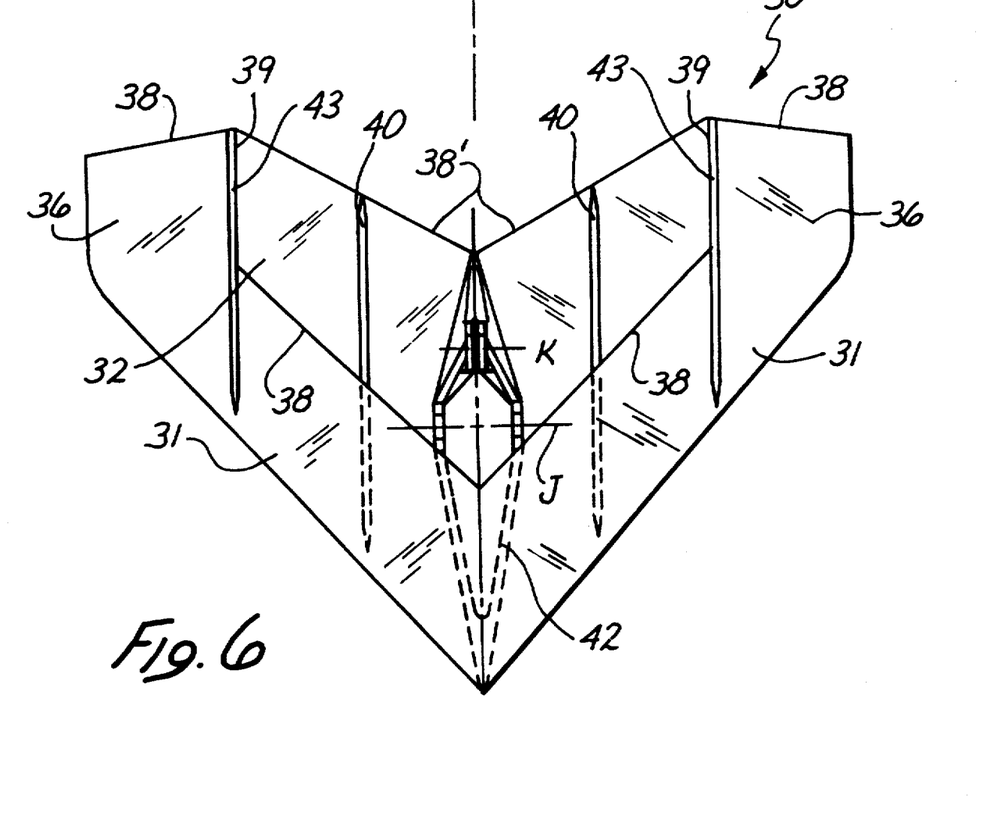
FIG. 6 is a top view of a portion of FIG. 5.

The wings 31 and 32 are arranged in respect to each other such that the upper wing 31 is arranged with regard to the flow direction, upstream from the lower wing 32 particularly of course in the protracted position of the water undercarriage 2. The wings 31 and 32 are stiffened through portions 40 which provide further connection whereby the connecting rods 43 and the portions 40 together form a bulkhead like closure. These parts avoid, in a partial submerged condition of the water wings 30 but whenever in a protracted position an influx of air, over the lower positioned wing 32.

A bearing or mounting part 42 is connected to the water wings 30 which bearing part 42 is pivotable at the main carriage leg 45, together with the water wing 30, and through the joints J. On the other hand the lever adjusting structure 50 is linked by means of and through the hinge K to the pivotable water wing 30.

The lever adjusting arrangement 50 is established through three groups of levers positioned one above the other, and the arrangement further includes the main carriage leg 45 to which all these elements are connected and they are also connected to each other as follows. A first, particularly lever linkage group is connected to the adjusting piston 51' cooperating with the adjusting cylinder chamber of a piston cylinder drive 51, the cylinder of which in turn is pivotable through the stationary linkage F. This particular group is shown in detail in FIG. 7, 8, 9, and includes further an angle lever 54 having arms 55 and 56 respectively.

Figure 7:
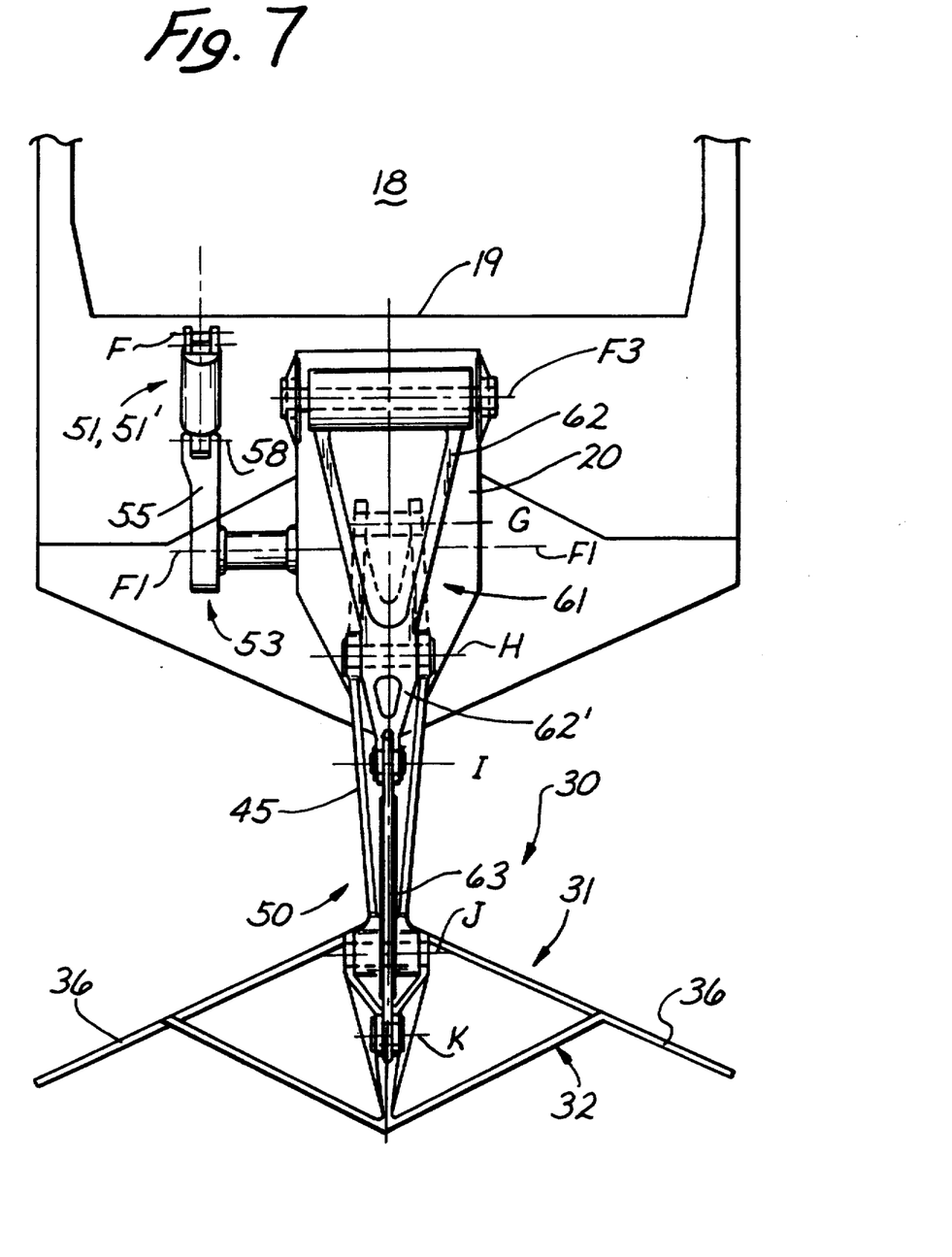
FIG. 7 is a partial view in side elevation and on an enlarged scale as far as FIG. 1 is concerned, showing the water undercarriage in combination with a lever adjustment drive as shown in a comparable way in FIGS. 2 and 4.
Figure 8:
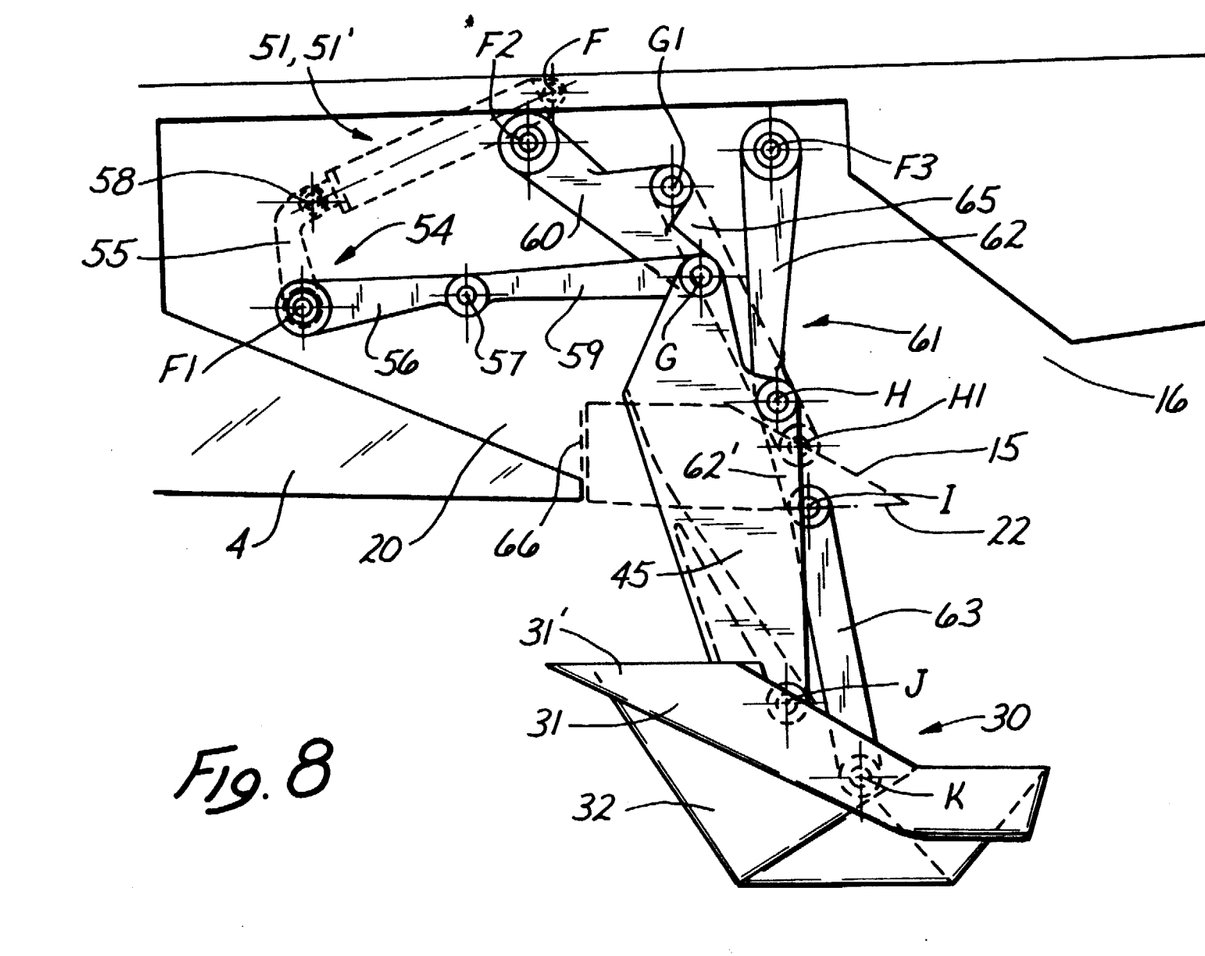
FIG. 8 is a portion in a side elevation, of the lower adjustment structure of FIG. 7 but now shown in conjunction with the water undercarriage in a protracted position.
Figure 9:
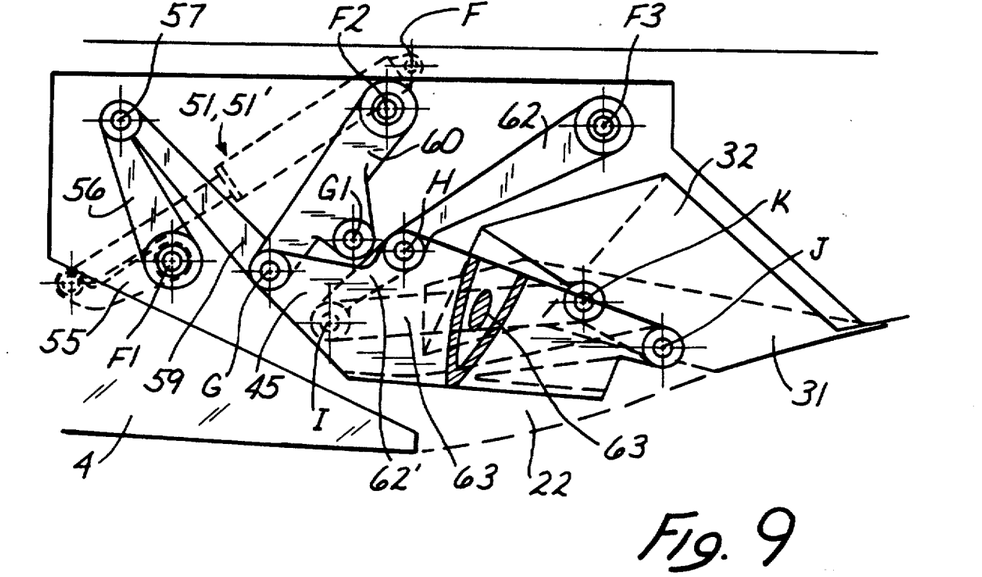
FIG. 9 and FIG. 10 are respectively section view and a side elevation of the water undercarriage in a retracted position.

The first lever group further includes a coupling lever 59 and a pivot lever 60 which is pivotably mounted to the fuselage 4 by means of an otherwise stationary pivot mount F2. The arm 55 of the angle lever 54 is connected to the adjusting piston 51' of the piston cylinder drive 51, the connection being made through the hinge 58. The arm 56 on the other end is hingedly connected to the coupled lever 59 through the hinge element 57.

The main carriage leg 45 of the water undercarriage 2 is mounted to the pivot and hinge G. In addition the adjusting lever 60 as well as the coupling lever 59 is connected thereto. This four wing and linkage group moveover causes the pivoting of the main carriage leg 45 as well be explained more fully below.

Another, the second linkage group of the three mentioned above includes also, the already mentioned carriage leg 45, and a pivot lever 61 which is pivotable about a stationary pivot mount and bearing F3. The lever 61 has arms 62 and 62'; and the group moreover includes a crank lever 63. Here then lever 61 pivots around the hinge H and carries on its free end the hinge I for the connection of the crank lever 63. The crank lever 63 is connected also to the hinge K of the water wings 30 and provides its adjustment and positioning by pivoting around the hinge J of the main carriage leg 45.

The third (or middle) linkage and lever group includes a connecting lever 65, hingedly connected to the lever 60 by means of hinge G1. The free end of lever 65 is moreover connected through the hinge H1 to the pivot lever 60 which with the free end is hingedly connected through a hinge G1 to the lever 60 and with its other end through H1 is connected to the closure flaps 22. The closure flaps 22 in turn are pivotally mounted to the fuselage 4 by means of hinges 66.

As can be seen from FIG. 8, levers 60, 65 and flaps 22, together with joints and hinges F2-G1-H1-66 establish of four hinge lever assembly of and drive. The lever 65 constitutes a swivel for pivoting flaps 22 in dependence of the position of wings 30. On protraction or retraction the flaps follow along the movement and deployment etc. of the wing group 30.

The example as illustrated and described thus far operates as follows. In the retracted position of the water undercarriage 2 the lever linkage drive 50 and the lower wing 32 of the water wing system 30 are situated within the chamber 20 and 20'. The upper wing 31 of the water wing 30 has a position which covers the chambers 20 and 20' on one hand and constitute in effect a portion of the fuselage contour whereby the fuselage of this fly boat 4 is provided with a keel.

For take-off and starting of the flying boat 1 from a floating position on water, and as FIG. 8 shows, the water wing 30 of the water undercarriage 2 is protracted actually prior to starting. As the flying boat begins to move and is driven through its drive engine 11, the water wing 30 will provide a hydrodynamic lift provided the aircraft wing 7 has a particular angle of attack. After the flying boat 1 has lifted of the water and the underwater carriage 2 has lifted too, only then the piston cylinder drive 51 is operated, that means the piston 51' pushes the piston rod out of the cylinder (compare FIGS. 8 and 9). The angle lever 54 now pivots on its mount F1 which is stationary with respect to the fuselage 4. Through the drive member and lever 59 and the hinge G on 45 an adjustment obtains of the main carriage leg 45 while simultaneously the lever 60 pivots around its pivot bearing F2 which likewise is stationary vis-a-bis the fuselage 4. The lever 61 pivots on its fixed hinge and pivot mount F3, together with the pivoting of the carriage leg 45 through the coupling by means of the linkage and hinge H.

In addition the connection through the hinge J causes the water wing system 30 to follow. The wing system 30 pivots through the aforementioned hinge J at the lower end of the carriage leg 45. Pursuant to this pivoting about the hinge point J, wing 30 is moved from its end position of maximum protraction as shown in FIG. 8 by 180 degrees to reach the final position of retraction which is shown in FIG. 9. Here then the upper side 31' of the wing 31 faces always the oncoming flow of air. This means that the wing system 30 in its retracted position will assume an upside down position, that is the reverse as far as the protracted position is concerned. In the retraced position of the wing system 30 the lower wing 32 therefore faces up and the previously upper wing part 31 now assumes a lower position for closing the opening of the space 20 and 20' owing to its V-shape. That shape is matched to the keel that is provided on the body and fuselage 4 the matching situation obtains as shown in FIG. 9.

More as far as retracting is concerned the upper wing 32 is completely inserted into the space 20 and 20' owing to the particular configuration of the wing system 30 as a whole and that of course is in addition aided by the particular configuration of the lever system 50. The cover flap 22 connected to and is pivoted around the hinges 66 on the fuselage 4, so that one now obtains a complete close-up of the space 20 and 20'; with a smooth transition to the remaining part of the fuselage 4 and its outer contour. Concurrently thereto, the flap 22 together with wing 31 provides coverage of the flow separate step that is common to conventional flying boats but presently that coverage of the flow separation edge enhances the smooth transition in the outer contour of the flying boat from the step to the contour behind the step. This feature is show in greater detail in FIG. 4.

Figure 11:
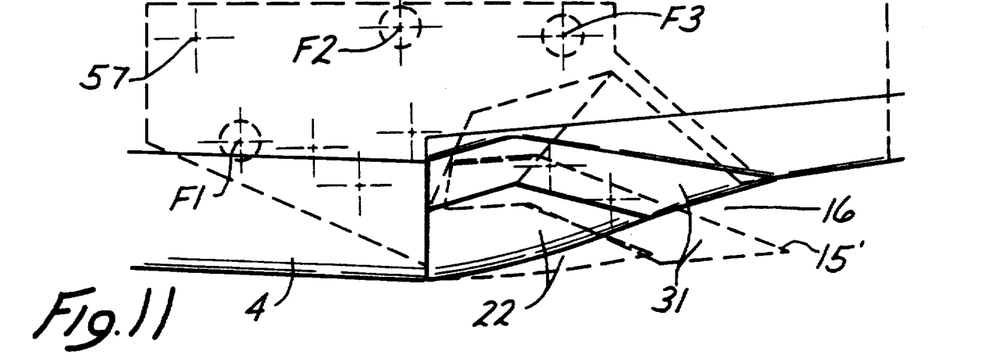
FIG. 11, 12, 13 are views of various protracted positions of that water undercarriage.
Figures 12, 13:
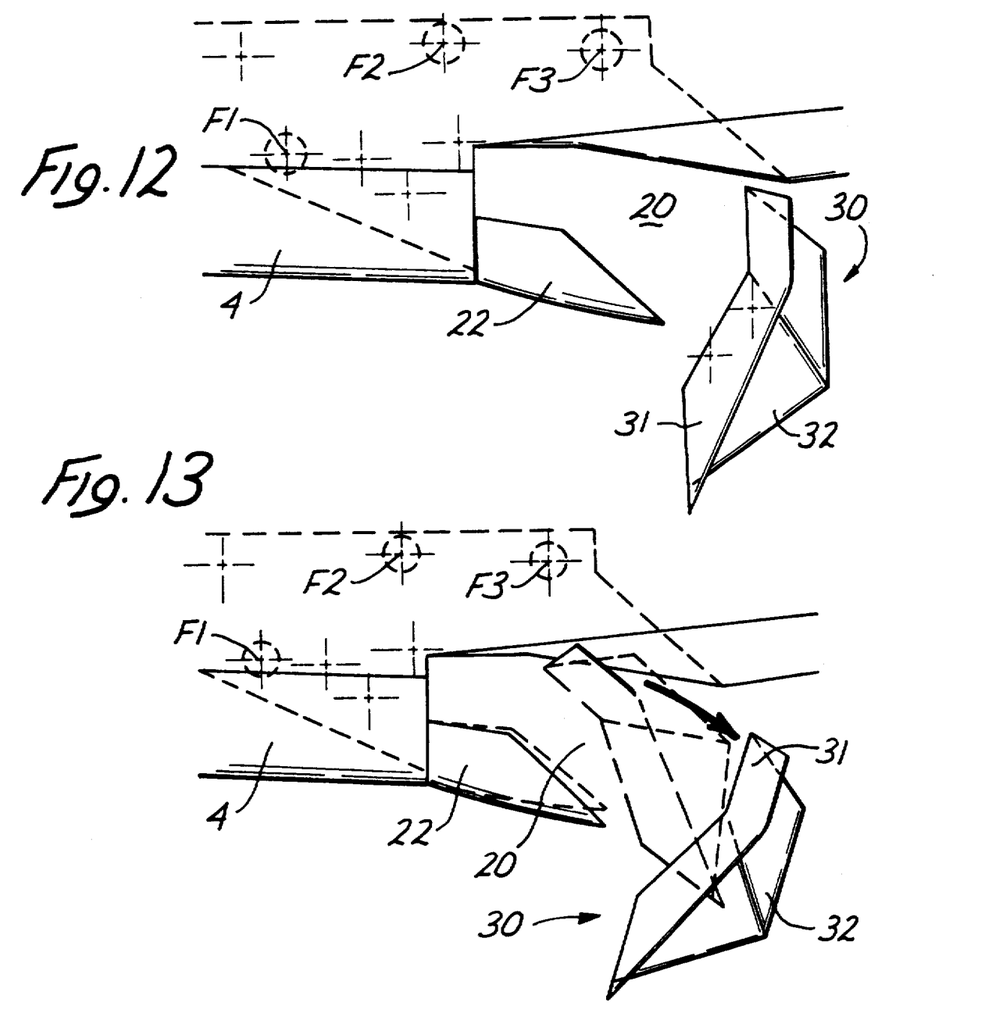

The inventive configuration of the water wing system 30 thus permits an almost completely avoiding of formation of additional drag during flight. FIGS. 11,12,13 illustrate certain intermediate positions of the water wing system 30 between a complete retraction and a complete protraction. Also shown is the position of flaps 22 under these different circumstances.

The three figures illustrate a complete cycle of positioning of the flaps 22. FIG. 11 shows the wing system 30 with levers in fully retracted position and also shown is the flap 22 (solid line). FIG. 12 illustrates a 90 degrees extension position and the open state of flaps 22. The levers have been omitted, but one readily sees that this is a transition state for the wings. Inside chamber 20 wing 32 is above wing 31, now in FIG. 12 one can seen the in between state, when they reverse roles. FIG. 13 shows a not yet full protraction, but wing 32 now begins shift under wing 31. FIG. 8 shows the fully retracted position of the wing system 30. The flaps 22 close again space 20 almost completely.

In the maximum protracting position of the water wing 30 flaps 22 have a particular position and together with the full separation 15' as well as the dead water 16 formation of an exposure step is provided which improves the lift-off of the equipment during the starting face from the water surface through providing full separation and formation of a field of eddies beyond the step. An intermediate position of the flaps with only a small deflection part as far as the wings 30 are concerned, results in a spread position which will immediately provide air into the dead water space 16 so as to obtain the effect of the step 15 for the take-off situation. This is particularly shown in FIG. 11 and facilitates greatly lift-off when occurring in shallow waters. In this case the edge 15' establishes the flow separation edge in connection with the dead water space 16.

As shown in FIG. 12, the position of the water wing system 30 for larger resistance and drag production cooperates with the flaps 22 when in the in maximum deflecting position. Owing to the resulting deflection the water has a shallow angle so as the wing surface of the wing portion 31 is concerned. This way more favorable flow condition obtain under reduction of the existing drag. This position however obtains only during very short periods of time during take off and landing. When the propeller drives are turned off and the craft floats on water, this position is a favorable one since it is akin to a drag anchor and thus prevents drifting of the flying boat on account of winds.

Figures 8A, 8B:
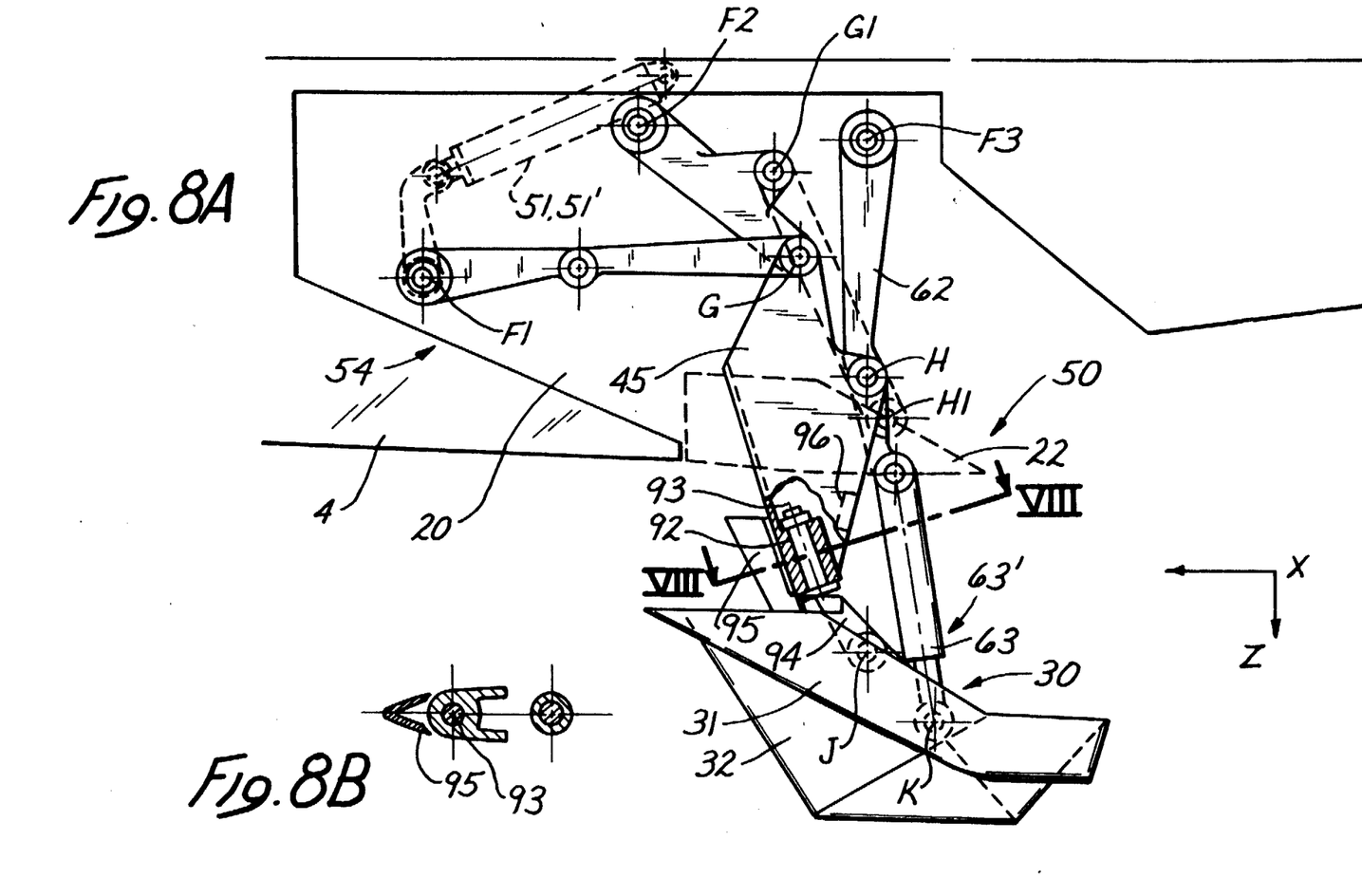
FIG. 8A is an example of a lever construction in conjunction with the water undercarriage and in protracted position.
FIG. 8B is a detailed view of a portion in FIG. 8A with a section indicated by VIII—VIII in FIG. 8.
Figure 8C:
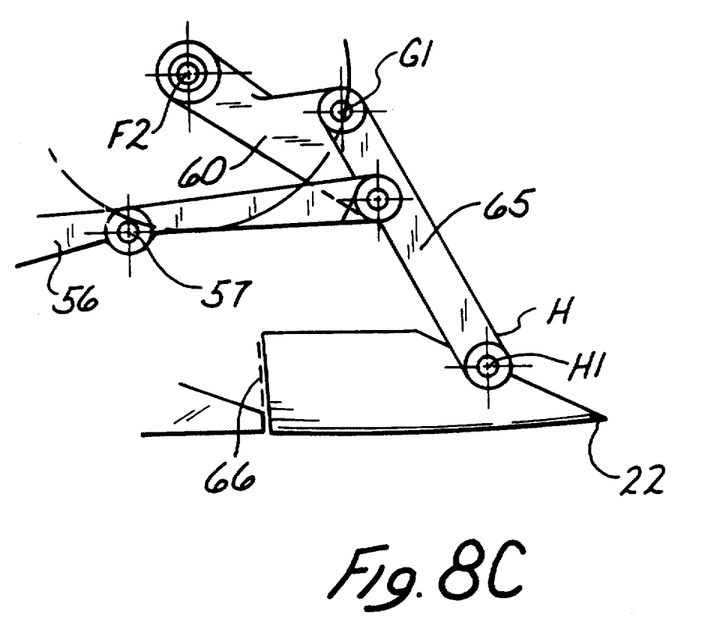
FIG. 8C shows a portion of FIG. 8 with some levers removed to facilitate view of those levers which are behind others in FIG. 8.

FIGS. 8A and 8B illustrate another example and embodiment of the invention which is a continuation of developments with reference to FIG. 7, 8, 8C and 9. In accordance with this feature of the invention a configuration is provided according to which a hydrofoil-like water wing 30 is pivotable vis-a-vis the fuselage around vertical and transverse horizontal axes of the craft. This is provided by operation of the pivot bearing and mount 92 on the main carriage leg 45. This way pivoting obtains of the water wing system 30 around a vertical axis perpendicular to the axis of the craft X which is transversely to the longitudinal axis of the craft. The mounts of the hydrofoil wings 30 will cause pivoting o the hydrofoils 30 about the vertical z-axis (yaw axis) equivalent to a wind vane and in a similar position that is effective in the direction of flow. The angle of attack was between ±20 degrees and oblique tot he longitudinal axis x. This particular adjustment obtains automatically as a result of the flow conditions. In order to obtain this result the main leg 45 is configured to have bearing 92 at the lower end and from a pivot or turning axis 63. This hinge of pivot receives a pin 94 which carries the main bearing for the wings at the lower end; the bearing is I. Through this configuration then the water wing system 30 can automatically pivot itself about its axis 93 which, as stated runs, approximately vertically. In order to permit this pivot motion the crank lever 63 is provided with ball bearings I and K.

In accordance with another example and embodiment, attenuating properties of the hydrofoil and wing system 30 are utilized particularly in the case of heavy seas. The crank lever 63 serves as a spring leg 63'. In the case of an impact e.g. by means of a wave or the craft just hits the water surface, the elastic or springly leg 63 yields resiliently so that the wing system 30 provides a pitch motion vis-a-bis the main bearing I and that changes the angle of attack which in turn reduces the impact load.

A cover 95 is provided on the pin 94 which will pivot together with the wing system 30 in the direction of the effective flow and that in turn reduces the water resistance for the main carriage leg 45. By means of guiding the resilient leg 63 in a cam configuration 96, 30 is centered the wing during retraction.

Figure 14:
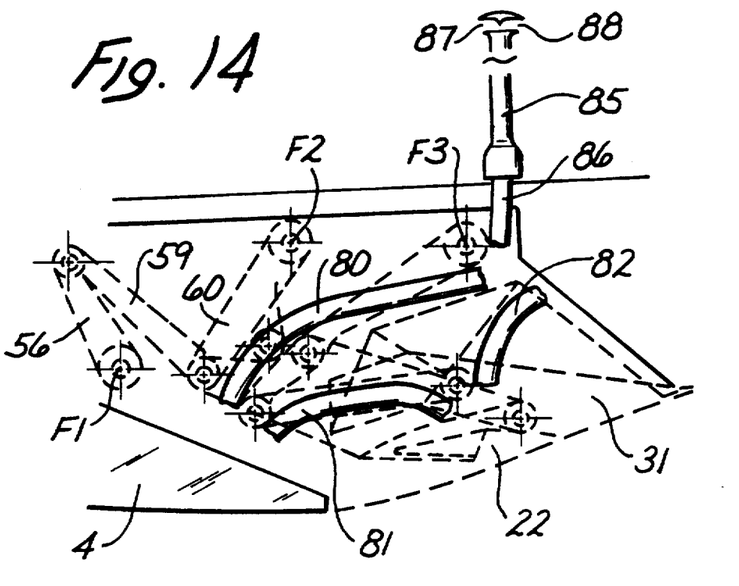
FIG. 14 depicts the lever adjusting device in a retracting position in conjunction with the pipe system for water scooping and further shown in a side view.
Figure 15:
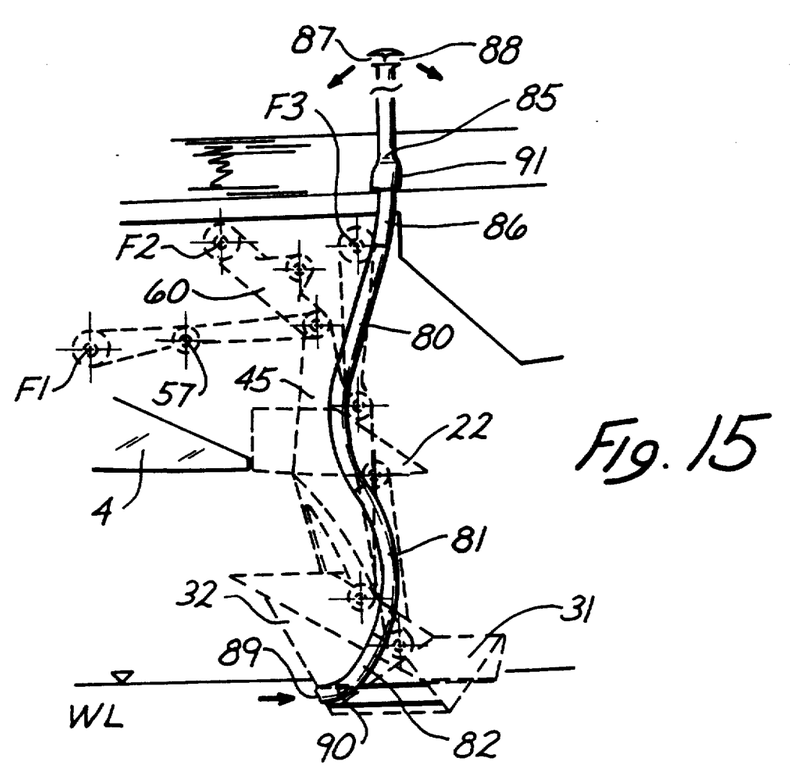
FIG. 15 shows a pipe system in a protracted position.

In the embodiment of FIGS. 14, 15 the lever linkage system 50 and certain tubular connections thereto establish a fire extinguishing water scoop construction. The arrangement of tube 80,81,82 is provided such that these parts when retracted are spaced savingly distributed around the lever system 5 but upon protraction of the wing 30 the tube parts 80,81,82 are positioned automatically in dependence upon the protracting motion of the wing 30 such that automatically these tubes 80,81,82 establish a close tubular conduit having an entrance scoop which is now positioned during flight so that the aircraft can scoop water from below.

The invention is not limited to the embodiments described above but all changes and modifications thereof, not constituting departures from the spirit and scope of the invention, are intended to be included.

I claim:

1. A vehicle of the flying boat or sea plane variety having a fuselage with a longitudinal axis and being constructed for and provided with means for obtaining a hydrodynamic lift, the improvement comprising:

a wing system linked to the boat or plane in order to obtain hydrodynamic lift when in a protracted position and including two wings arranged one above the other but establishing, in front view, a closed frame including an upper wing of the wing system having in said protracted position a negative, downward facing V position and a lower wing of the wing system having, in said protracted position from the fuselage, a positive, upwardly facing V position, both wings of the wing system being provided in an arrow configuration a point of which faces forward; and means for completely retracting said wing system into the fuselage of the vehicle, including a lever system for pivoting both wings to turn them over by 180 degrees about an axis extending transversely to said longitudinal axis, to store them in the fuselage in an upside down or reverse order.

2. Improvement as in claim 1, the frame of said wing system being of rhombic configuration in said front view.

3. Vehicle as in claim 2, wherein the upper wing extends in the direction of wing span beyond the lower wing.

4. Vehicle as in claim 2, wherein outer ends of the lower wing are connected to the upper wing inwards from an outer extension of the upper wing.

5. Vehicle as in claim 2, including connecting bars extending in the direction of the wings for connecting the upper wing to the lower wing.

6. Vehicle as in claim 5, wherein said connecting bars extend substantially over the wing depths of both wings.

7. Vehicle as in claim 2, wherein additional partitions are provided for in the interior of the frame, as bulkheads.

8. Vehicle as the claim 1, including a lever linkage as well as piston cylinder drive and pivot bars for the wing system to which the lever linkage is connected for pivoting the wing system along an axis that runs transverse to the longitudinal axis.

9. Vehicle as in claim 1, the upper wing, on retracting, covering a portion of a storage space for the wings.

10. Vehicle as in claim 9, there being an additional flap for covering a gap between the fuselage and the covering wing.

11. Vehicle as in claim 1, wherein the lever system is pivoted to three points in the fuselage resulting in three lever groups, one of the groups being provided for turning the wings over, a second one of the groups being provided for pivoting a covering flap, the flap being provided for covering a storage space for the wings in the fuselage a third one of the groups being provided for connecting a drive to an undercarriage leg, the wings pivoting on that leg.

12. Vehicle as in claim 11, wherein the first group includes a resiliently reacting lever.

13. Vehicle as in claim 1, the wings having disposition for automatically flow dynamically adjusting their orientation about the vertical yaw axis.

14. Vehicle as in claim 1 including control means for steering on water.

15. Vehicle as in claim 1 and including a water scoop system deployable during flight.

16. Vehicle as in claim 1, wherein the lower wing has a portion so that upon retraction of the wing system the lower wing smoothly covers an opening for the wing system in the fuselage in an aerodynamically smooth fashion.

* * * * *